(12) United States Patent
Rabeony

(10) Patent No.: US 9,415,706 B2
(45) Date of Patent: Aug. 16, 2016

(54) CHILD CAR SEAT TO BE FITTED TO A VEHICLE SEAT

(75) Inventor: Haja Rabeony, Cholet (FR)

(73) Assignee: Dorel Juvenile Group, Inc., Foxboro, MA (US)

( * ) Notice: Subject to any disclaimer, the term of this patent is extended or adjusted under 35 U.S.C. 154(b) by 219 days.

(21) Appl. No.: 14/113,841

(22) PCT Filed: Apr. 27, 2012

(86) PCT No.: PCT/EP2012/057816
§ 371 (c)(1),
(2), (4) Date: Nov. 21, 2013

(87) PCT Pub. No.: WO2012/146743
PCT Pub. Date: Nov. 1, 2012

(65) Prior Publication Data
US 2014/0070581 A1    Mar. 13, 2014

(30) Foreign Application Priority Data

Apr. 29, 2011  (FR) .................................... 11 53667
Jul. 25, 2011   (FR) .................................... 11 56752

(51) Int. Cl.
*B60N 2/28* (2006.01)

(52) U.S. Cl.
CPC ............ *B60N 2/2821* (2013.01); *B60N 2/2809* (2013.01); *B60N 2/2824* (2013.01); *B60N 2/2857* (2013.01); *B60N 2/2869* (2013.01); *B60N 2/2812* (2013.01)

(58) Field of Classification Search
CPC .. B60N 2/2869; B60N 2/2857; B60N 2/2821; B60N 2/2809; B60N 2/2824; B60N 2/2812

USPC ....................... 297/256.12, 256.16
See application file for complete search history.

(56) References Cited

U.S. PATENT DOCUMENTS

| | | | | |
|---|---|---|---|---|
| 4,681,368 A * | 7/1987 | Heath et al. | ............... | 297/216.11 |
| 5,630,645 A * | 5/1997 | Lumley et al. | ............. | 297/250.1 |
| 5,658,051 A * | 8/1997 | Vega | ...................... | B60R 22/26 280/808 |
| 5,695,243 A * | 12/1997 | Anthony et al. | ............ | 297/250.1 |
| 5,988,758 A * | 11/1999 | Heintzelman | ........... | B60R 22/26 297/473 |
| 7,029,069 B2 * | 4/2006 | Hendren et al. | ......... | 297/256.12 |
| 7,635,167 B2 * | 12/2009 | Okazaki | ................. | B60N 2/688 280/808 |
| 7,735,934 B2 * | 6/2010 | Fuhrken | .................. | B60R 22/20 280/808 |
| 7,753,445 B2 * | 7/2010 | Kassai et al. | ............. | 297/256.16 |

FOREIGN PATENT DOCUMENTS

| | | | |
|---|---|---|---|
| EP | 1145898 A1 | 10/2001 | |
| EP | 1145899 A1 | 10/2001 | |
| EP | 2263910 A1 | 12/2010 | |

(Continued)

OTHER PUBLICATIONS

English translation of the International Preliminary Report on Patentability issued in connection with PCT/EP2012/057816.

(Continued)

*Primary Examiner* — David R Dunn
*Assistant Examiner* — Tania Abraham
(74) *Attorney, Agent, or Firm* — Barnes & Thornburg LLP

(57) ABSTRACT

A car seat for a child intended to equip a vehicle seat. The car seat includes a base and a chair having a seat support and a backrest.

15 Claims, 4 Drawing Sheets

(56) References Cited

FOREIGN PATENT DOCUMENTS

Figure 1:
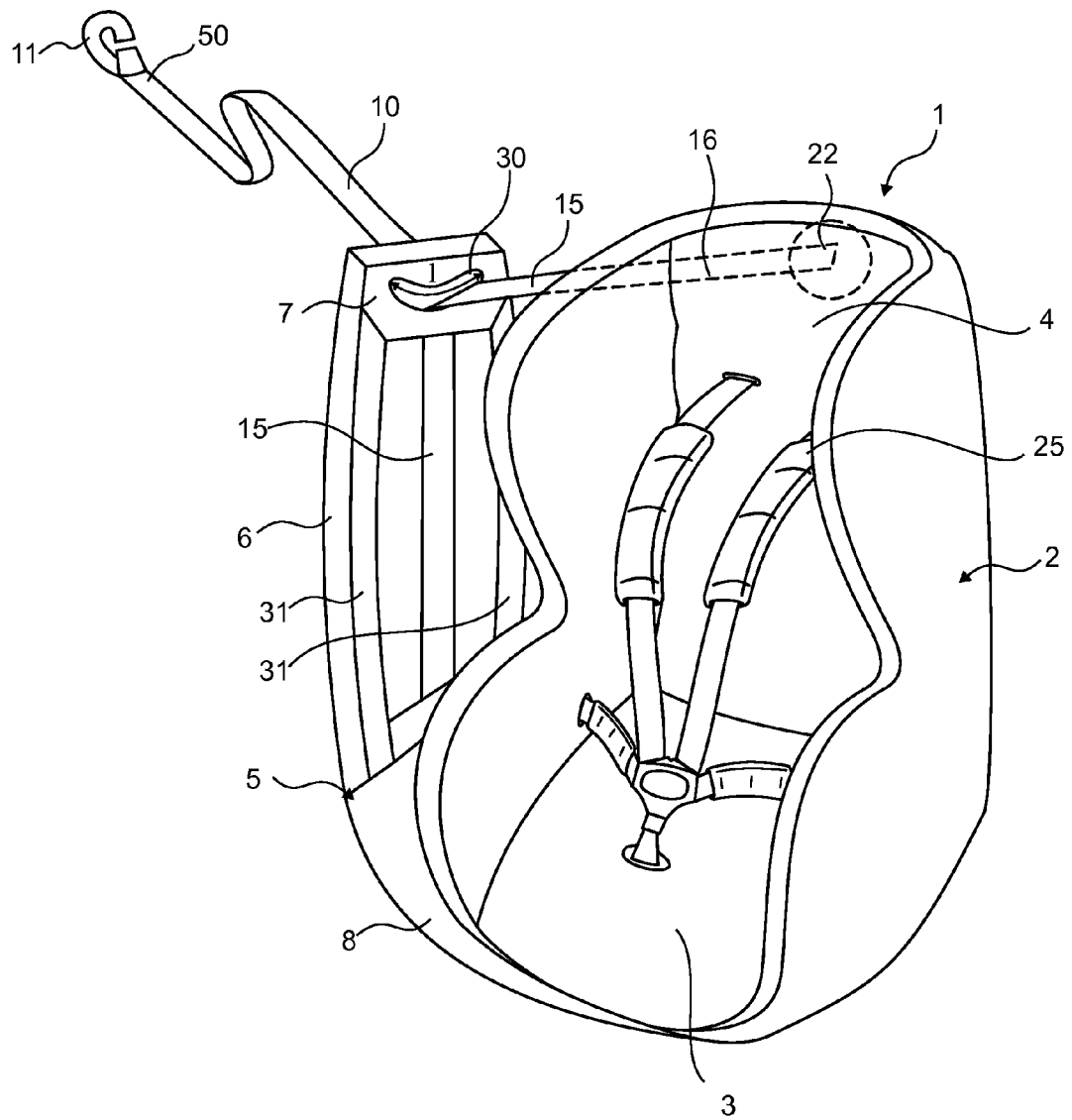

| | | | | |
|---|---|---|---|---|
| FR | WO 2004052677 A1 | * | 6/2004 | ............ B60N 2/2821 |
| FR | EP 2261076 A1 | * | 12/2010 | ............ B60N 2/2806 |
| GB | 2159401 A | * | 12/1985 | ............ B60N 2/2821 |
| WO | 2007/062828 A1 | | 6/2007 | |

OTHER PUBLICATIONS

PCT International Search Report and Written Opinion completed by the ISA/EP on May 22, 2012 and issued in connection with PCT/EP2012/057816.

\* cited by examiner

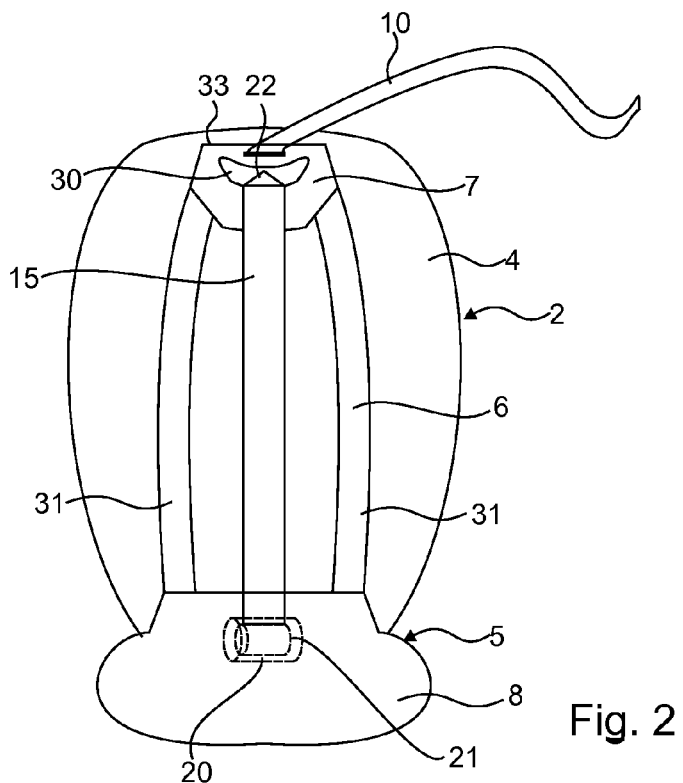
Fig. 2
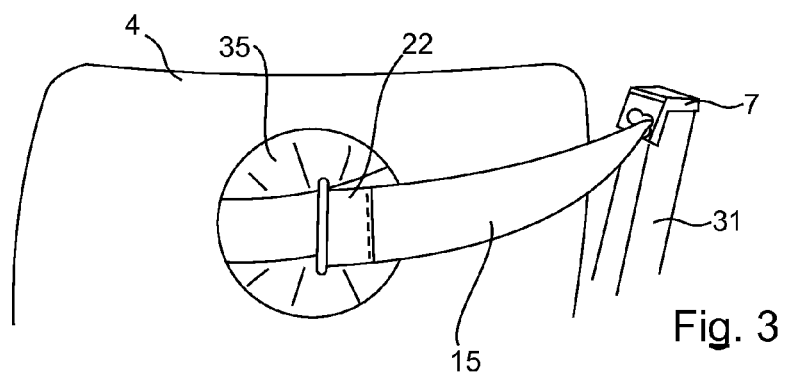
Fig. 3
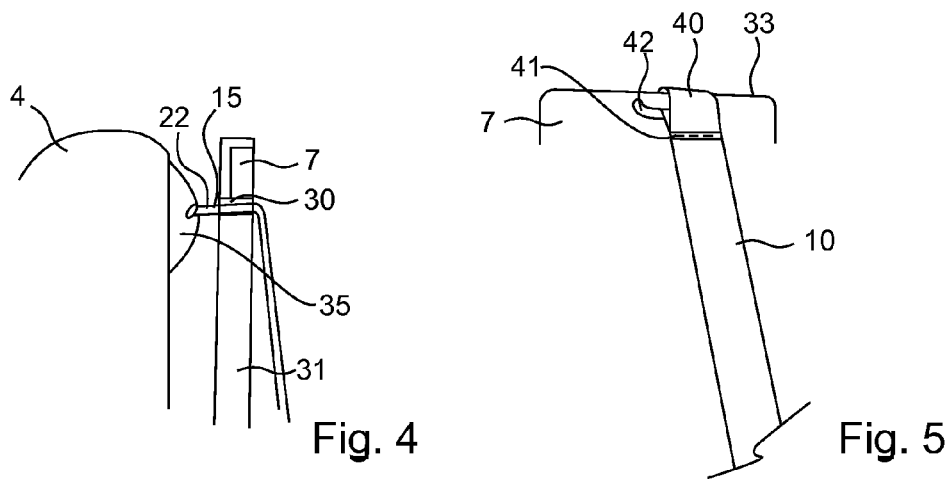
Fig. 4
Fig. 5

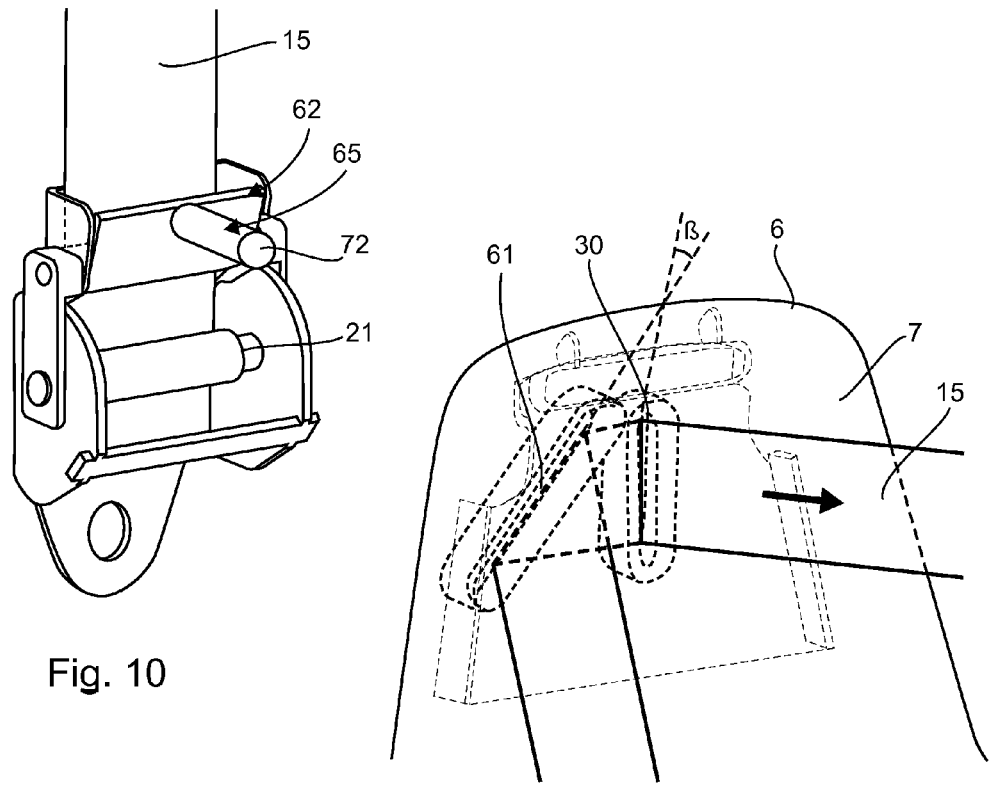
Fig. 10
Fig. 11
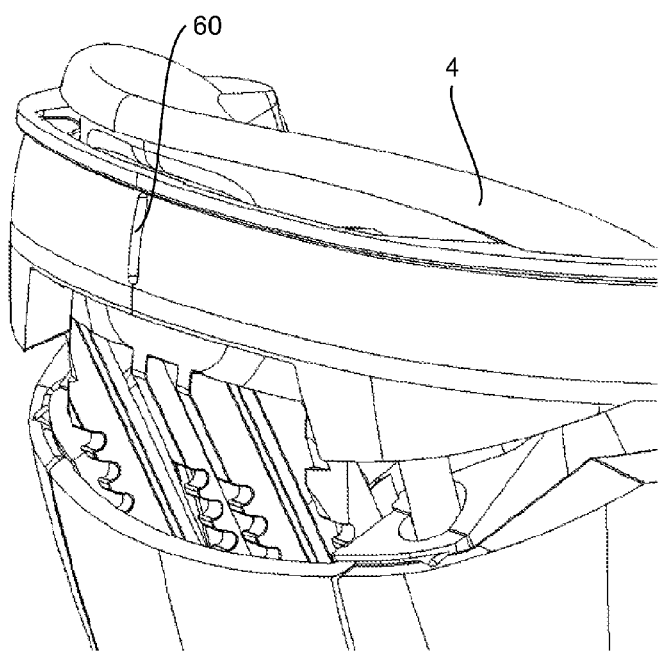
Fig. 12

CHILD CAR SEAT TO BE FITTED TO A VEHICLE SEAT

CROSS REFERENCE TO RELATED APPLICATIONS

This application is a U.S. nationalization under 35 U.S.C. §371 of International Application No. PCT/EP2012/057816, filed Apr. 27, 2012, which claims priority to French Application Nos. 1153667 and 1156752, filed Apr. 29, 2011 and Jul. 25, 2011 (respectively).

FIELD OF THE DISCLOSURE

The field of the disclosure is that of child care. More precisely, the disclosure concerns car seats for children that are intended to be installed on passenger seats in vehicles, in particular motor cars. It concerns in particular the securing of these car seats for children, in particular the effective and secure holding of these, in the event of shocks or abrupt movements, so as to guarantee the safety and comfort of the child being transported.

SUMMARY

A car seat for a child in accordance with the present disclosure is intended to equip a vehicle seat, and comprises:
 a chair comprising a seat support and a backrest, and
 a base with respect to which the chair is able to move in rotation between at least one transport position and at least one position of installation of a child,
 the car seat being secured to the vehicle by fixing clamps or by a safety belt on the one hand and an anti-tilt strap connecting said base to an anchoring point of the vehicle on the other hand.

According to the present disclosure, the car seat comprises connection means of variable length comprising an end integral with, or fixed to, the base and another end integral with, or fixed to, a top part of the backrest, said variable-length connection means thus connecting the base to the top part of the backrest.

Thus, by means of the present disclosure, the anti-tilt strap connected to the base keeps a fixed tensioned length whatever the position of the chair. Moreover, the variable-length connection means make it possible to move the chair, in rotation in particular, with respect to the base.

In this way, it is in particular possible to produce car seats enabling the chair to be installed facing the road or back to the road. The anti-tilt strap remains mounted in the same way, without it being necessary to move it or extend it. The variation in distance due to the position of the backrest in one or other of the positions is absorbed by the variable-length connection means.

This approach also makes it possible to vary the length of the connection means in order to change to an installation position.

LIST OF FIGURES

Figure 6:
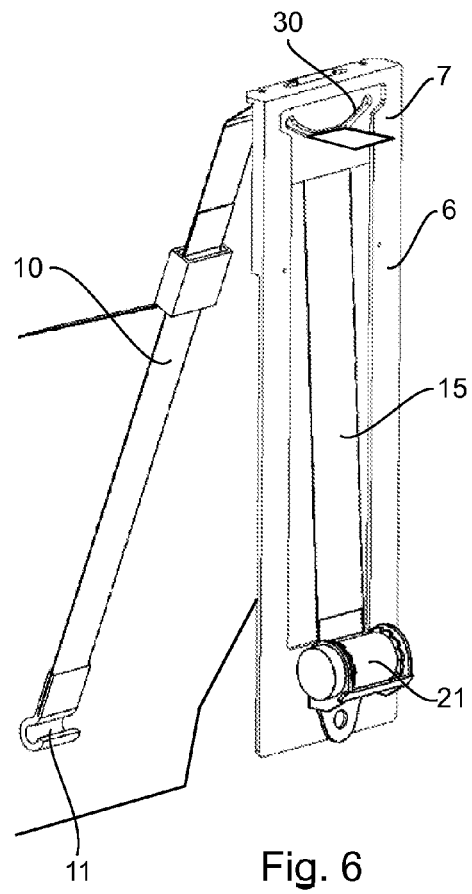
Figure 7:
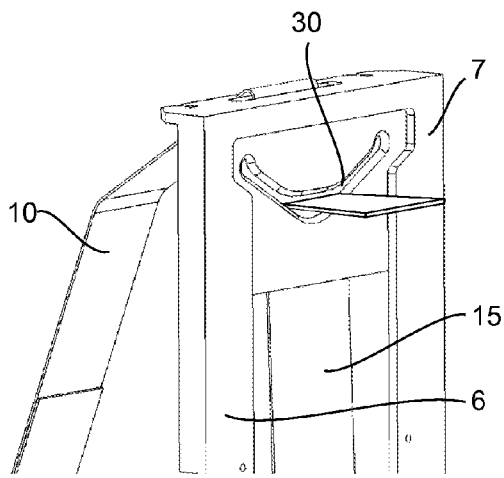
Figure 8:
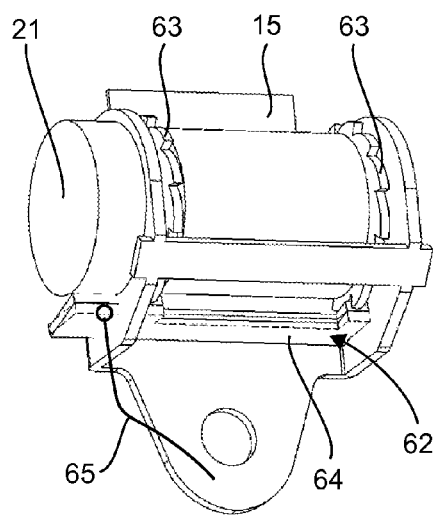
Figure 9:
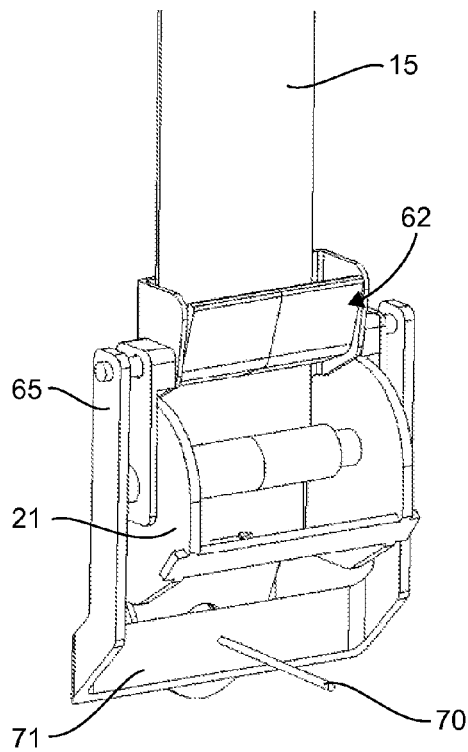

Other features and advantages of the invention will emerge more clearly from a reading of the following description of an embodiment of the invention, given by way of illustrative and non-limitative example, and the accompanying drawing in which:

FIG. 1 illustrates schematically in perspective a car seat for a child according to the invention, shown in the position of installation of the child, FIG. 2 shows schematically the car seat of FIG. 1 seen from the back and in the transport position, FIG. 3 shows schematically and partially the rotationally movable element of the car seat of FIG. 1, the car seat being disposed in the installation position, FIG. 4 shows in schematic and partial side view the rotationally movable element of FIG. 3, the car seat being disposed in the facing-the-road transport position, FIG. 5 shows schematically and partially an example of fixing the anti-tilt strap, FIG. 6 shows schematically and partially an example of vertical extension with a connection strap, reel and anti-tilt strap, FIG. 7 shows schematically the top of the vertical extension illustrated in FIG. 6, FIG. 8 shows in isolation, schematically, an example of a reel that may be used in the car seat according to the invention, FIG. 9 shows in isolation, schematically, another example of a reel that can be used in the car seat according to the invention, FIG. 10 shows in isolation, schematically, the reel of FIG. 9 controlled by locking means other than those of FIG. 9, FIG. 11 illustrates in isolation, schematically and partially, the top of another example of a vertical extension that can equip the car seat according to the invention, and FIG. 12 shows schematically and partially another example of fixing of the connection strap to the backrest of the car seat according to the invention.

DETAILED DESCRIPTION OF AN EMBODIMENT OF THE INVENTION

FIG. 1 shows a car seat 1 for a child intended to equip a vehicle seat, in accordance with the invention.

This car seat 1 comprises a chair 2 comprising a seat support 3 and a backrest 4. The car seat 1 also comprises a base 5 intended to be placed on the seat of the vehicle. The base 5 comprises a substantially vertical extension 6 extending along the backrest 4 of the chair 2. The base 5 also comprises a bottom part 8. The chair 2 may comprise a harness 25, of the so-called five-fixing-points type, provided in this embodiment with sleeves and a fixing loop, visible in FIG. 1, in a manner known per se.

The vertical extension 6 of the base has a top part 7. The car seat according to the invention is secured to the vehicle by fixing clamps, not visible in the figures, of the Isofix® type, and by an anti-tilt strap 10 connecting the car seat to an anchoring point of the vehicle (not shown in the figure for reasons of clarity of the drawing). The end 50 of the anti-tilt strap 10 that is intended for an anchoring point of the vehicle is provided in this example with a hook 11 visible in the figure.

According to the invention, the anti-tilt strap 10 is fixed to the base 5, in particular, in the example illustrated, to the top part 7 of the vertical extension 6 of the base 5.

The chair 2 is able to move in rotation with respect to the base 5 between at least one transport position and at least one position of installation of a child.

The car seat illustrated can occupy a facing-the-road transport position and a back-to-the-road transport position. Naturally the invention also applies to the cases of car seats that can adopt only one of these two transport positions.

In FIG. 1, the chair 2 is shown in the position of installation of the child, at approximately 90° from the back-to-the-road or facing-the-road transport position, so that it is situated facing the door, so as to enable the child to be installed and removed simply and comfortably. Preferably, two installation positions are possible, according to the placing of the car seat in the vehicle, on the left-door or right-door side.

According to this embodiment of the invention, the car seat comprises connection means of variable length connecting the base 5 to a top part 16 of the backrest 4 of the chair 2, these variable-length connection means comprising an end secured to the base and another end secured to a top part of the backrest.

The car seat comprises means for controlling the connection means allowing or preventing a variation in their length.

In the embodiment of the invention, the variable-length connection means comprise a variable-length connection strap 15 connecting the top part 16 of the backrest 4 of the chair 2 to the base 5, in particular the bottom part 8 of the base 5. The connection strap 15 passes, in this example, through the top part 7 of the vertical extension 6 of the base 5.

The connection strap 15 comprises a first end 20, visible in FIG. 2, secured to a reel 21 mounted on the base 5, in this example on the bottom part 8 of the base 5. The connection strap 15 comprises a second end 22 fixed to the backrest 4, as can be seen in FIG. 3 or 4. According to another embodiment, the reel may be installed in the backrest of the chair. However, it seems advantageous, in practice, for the reel to be in the base, which remains fixed and close to means for unlocking the rotational connection between the seat and the base.

In the example illustrated, the connection strap 15 passes through an opening 30, consisting in this example of an aperture in an arc of a circle, formed in the top part 7 of the vertical extension 6 of the base 5. The opening 30, in this example, has a length 1, following the curvature of the opening 30 as can be seen in FIG. 1, sufficient to allow a rotation of the chair without folding or twisting of the connection strap. Another example of an opening 30 consisting of an aperture substantially in the form of an arc is visible in FIGS. 6 and 7.

In another embodiment, illustrated in FIG. 11, the connection strap 15 passes through two openings 30 and 61, the openings 30 and 61 comprising in this example slots forming a non-zero angle β between them. In particular, the opening 30 consists here of a vertical slot and the opening 61 also consists of a slot in this example, this slot forming an angle β with the opening 30 lying between approximately 15° and 75°, as can be seen in FIG. 11. The connection strap 15 passes through the openings 30 and 61, which enables the strap to be returned on one side towards the backrest 4, from the opening 30, and on another side towards the reel 21, from the opening 61.

This configuration is advantageously defined so as to allow optimised sliding of the strap 15, such as for example an appropriate material, a suitable surface appearance and/or surface treatment, rollers, cylinders, etc.

As can be seen in FIGS. 1, 3 and 4, the second end 20 of the connection strap 15 is, in this embodiment, fixed to the backrest 4 by means of a rotationally movable element 35 having in this example in the form of a hemisphere secured to the backrest 4 and mounted so as to be able to rotate relative to the backrest 4 according to an axis substantially perpendicular to the backrest.

Thus, when the chair 2 turns relative to the base 5, the connection strap 15 rotates the movable element 35. The latter then turns relative to the backrest 4. As illustrated in FIGS. 3 and 4, the end 22 of the connection strap is substantially horizontal when the chair is in the facing-the-road transport position (FIG. 4) and pivots so as to be substantially vertical when the chair is brought to an installation position (FIG. 3) or a back-to-the-road transport position.

Another type of fixing of the connection strap 15 to the backrest by means of a slot 60, rather than a rotationally movable element, has been illustrated in FIG. 12.

In the example illustrated, the vertical extension 6 comprises a post 31 forming an arch that can be seen in FIGS. 1 and 2. The height of the arch forms the top part 7 of the vertical extension 6. Another solid or perforated structure, for example as illustrated in FIG. 11, may of course be provided, provided that the strength of the vertical extension, and in particular of its top part, is adapted to ensure the safety of the child, in compliance with the standards in particular.

The control means comprise in this example means 62 of locking the reel 21, arranged to prevent an unwinding of the connection strap from the reel. These means of locking the reel 21 are automatically triggered when the car seat is in the transport position. This locks the length of the connection strap 15 in the transport position, thus preventing the chair 2 from moving relative to the base 5.

The locking means may for example comprise a catch guided in the support of the reel and/or a first toothed wheel not able to move in rotation, interacting with one or more toothed wheels rotationally integral with the reel, in a locked state, and disconnecting from this toothed wheel in an unlocked state.

On the other hand, when the car seat leaves the transport position in order to be directed to an installation position, the locking means 62 are deactivated so as to be able to release a previously wound up connection strap portion 15, if necessary.

The user has a manual unlocking control 65 for rotationally disconnecting the chair and the base, in order to move the chair to an installation position. This unlocking control 65 acts on the locking means in order to release the reel.

The locking can in particular be obtained by immobilising the reel and/or directly locking the strap. In both cases, it is not possible to unwind the strap, which thus keeps a fixed length, and therefore behaves as a fixed strap (without reel), as long as the unlocking control 65 has not been activated.

A first embodiment, in which the reel 21 is equipped with locking means 62, has been illustrated in FIG. 8. In this example, the locking means 62 are configured so as to lock the reel 21 (that is to say to prevent a rotation enabling the strap to be unwound). These locking means 62 comprise two toothed wheels 63, disposed on either side of the wound up connection strap portion 15, and a catch 64. In other embodiments, a single toothed wheel may be provided.

The catch 64 in engagement with the toothed wheel 63 prevents the unwinding of the connection strap 15. The unlocking control 65 comprises in this example a cable connected to a control button (not illustrated) and enables the catch 64 to be disengaged in order to unlock the reel 21 and to allow rotation thereof, and therefore the unwinding of a necessary length of connection strap 15.

In the second embodiment illustrated in FIGS. 9 and 10, the locking means 62 are configured to lock the wound up strap and to prevent it from unwinding. The locking means 62 comprise an auto-clamping element gripping the connection strap 15 against a fixed part in which the strap travels, so as to immobilise the latter.

The unlocking control 65 comprises, in the example illustrated in FIG. 9, a cable 70 and a lever 71, the cable being connected to actuation means not illustrated, to allow the pivoting of the auto-clamper, so as to release and therefore allow the unwinding of the connection strap 15, where applicable.

In the variant illustrated in FIG. 10, the unlocking control 65 comprises a push button 72 for releasing the auto-clamper by bearing on a portion thereof, so as to pivot it in order to release the connection strap 15 if necessary.

Return means, not illustrated, tend to return the auto-clamper into the locking position, in the absence of action by the user.

Yet another example of an unlocking control 65 that can be used is described in the patent application FR 1153668 entitled "Pivoting car seat for a child, intended to equip a vehicle seat", incorporated by reference.

This patent application FR 1153668 also has a mechanism for limiting the possible rotation range for the chair with respect to the base, in particular preventing this chair making several turns, and therefore the strap unwinding in an undesired fashion, twisting, locking and/or adopting a position dangerous for the safety of the child.

In other embodiments, a specific control may be provided for releasing the reel. Thus:
  when the seat is in a transport position, the real is locked, and the connection strap length is fixed (and minimum, if the chair is facing the road, or maximum if the chair is back to the road). The situation can be assimilated to a fixed connection between the top part of the backrest and the top part of the base;
  when the seat is no longer in a transport position (that is to say when it is in an installation position or in movement between a transport position and an installation position), the reel is unlocked, and the connection strap can therefore unwind or wind up.

When the user moves the chair to an installation position, the connection strap therefore unwinds gradually, if the chair were facing the road (and winds up if the chair were back to the road). It winds up, or respectively unwinds, once again when the user returns the chair to a transport position. The presence of the reel 21 also assists the user in the rotation of the chair in order to change from an installation position to a transport position.

According to a variant embodiment, the reel can be equipped with a "reel-locker" system as used conventionally for vehicle safety belts. This system locks the reel in the event of shock, acceleration, braking or inclination greater than a predetermined threshold. For the rest of the time, the belt can be unwound or wound up, and the chair can be moved.

When the car seat is in the facing-the-road transport position, the length of the connection strap 15 is therefore minimum and the winding up on the reel 21 is maximum. On the other hand, when the chair 2 is in the installation position, as illustrated in FIG. 1, the connection strap 15 is longer. In the back-to-the-road transport position, the length of the connection strap 15 is maximum.

The connection strap 15 has two portions, a substantially vertical portion, extending in or along the vertical extension 6, the length of which remains substantially unchanged, and a substantially horizontal portion, between the top end 33 of the vertical extension and the backrest, the length of which may vary.

It should be noted that the top end 33 of the vertical extension 6 is formed at a height substantially equal to that of a top end of the backrest 4.

The opening 30 is formed in this example close to the top end 33 of the vertical extension 6.

As can be seen in FIG. 5, the anti-tilt strap 10 can be fixed to the top part 7 of the vertical extension, its end 40 forming a return on itself and fixed by a stitching 41, the return encompassing a portion of the top part 7 of the vertical extension 6 by means of a complementary opening 42 formed at the top end 33 of the vertical extension 6.

The invention is of course not limited to the examples that have just been described.

Throughout the description, the expressions "having a" or "comprising a" must be understood as been synonymous respectively with the expressions "having at least one" and "comprising at least one", unless the contrary is specified.

Car seats can be secured to the vehicle by means of the vehicle safety belt. Another approach, more reliable and in particular avoiding the risks of faulty installation of the safety belt, has appeared during the past few years, meeting the so-called "Isofix"® standard.

These car seats for children comprise an anchoring system comprising fixing clamps, in general two in number, which are secured to anchoring points provided in the vehicle, and generally accessible between the backrest and seat support of the seat of this vehicle. An indicator makes it possible to verify that the fixing clamps are correctly secured on the anchoring points of the vehicle. The risks of faulty fixing of these clamps of the vehicle are thus reduced.

The regulations associated with Isofix® provide that a third element must be provided on the structure of the seat or base, to prevent the car seat tilting in the case of accident, impact or abrupt braking. This third element is generally provided either by a strut supporting the structure by bearing on the floor of the vehicle or by an anti-tilt strap, also referred to as a "top tether" strap, securing an upper part of the structure of the seat to an attachment element of the vehicle provided for this purpose.

When an anti-tilt strap is provided, it must have a minimum length of 2 m, fixed by the regulations, to allow securing in any type of vehicle.

In order to be effective and to fulfil its role of holding the structure of the seat in the case of accident, this anti-tilt strap must be tensioned. This is why provision is made for it to be associated with a tension, or non-play, indicator.

In the case of car seats that may have a rotation and/or inclination movement, the anti-tilt strap, which must remain tensioned in operation, may be provided to be secured to an upper pan of a vertical extension of the base. These car seats then provide a means of fixing the chair to the base preventing tilting thereof at the time of an impact. These car seats cannot be placed in a back-to-the-road position.

The car seat of the present disclosure is better secured and more efficient on the dynamic level, while allowing easy change from a transport position to a position of installation of a child, and vice versa. The car seat can be used in the back-to-the-road transport position.

Preferentially, the car seat comprises means of controlling the connection means between the base and the top part of the backrest thus allowing or preventing a variation in their length.

This is because, when the car seat is in a transport position, facing the road and/or back to the road, and/or in the case of a significant shock (accident, braking, etc.) it is desirable for the length of the connection means not to vary, so that the holding of the seat with respect to the base be as effective as possible. The control means ensure this blocking, or locking, and release, or unlock, the variation in length, to change from one transport position to another, or from a transport position to an installation position. A manual unlocking control may be provided, to act on these control means and to control the unlocking. Locking may be automatic as soon as the chair is brought into a transport position.

The anti-tilt strap has for example an end connected to an upper part of a vertical extension of the base and another end intended to be fixed to the anchoring point of the vehicle.

According to a preferential but not exclusive embodiment, the connection means comprise a connection strap.

In this case, the connection strap may be guided along a vertical extension of the base and connect the top part of the backrest to a bottom part of the base, the connection strap comprising an end secured to the base and another end secured to a top part of the backrest.

The connection strap passes for example at least through an opening formed in a top part of the vertical extension of the base.

In one embodiment, the connection strap passes through an opening, this opening being able for example to define an arc for modifying the orientation of the plane defined by the surface of the connection strap at this opening.

This type of opening facilitates the movement of the connection strap in the opening, when the seat is rotated with respect to the base in order to change from a transport position to an installation position and vice versa.

In another embodiment, the connection strap passes through two openings, the openings being able to comprise slots forming a non-zero angle between them. These two slots through which the connection strap passes make it possible to modify the orientation of the plane defined by the surface of the connection strap on its travel.

The connection strap may comprise a first end secured to a reel mounted on the base or on the backrest and a second end fixed respectively to the backrest or to the base.

In this case, the control means may comprise means for locking the reel, arranged to prevent the unwinding of the connection strap from the reel. These means for locking the reel may for example be configured in order to be triggered automatically when the car seat is in the transport position. This makes it possible to lock the length of the connection strap in the transport position, thus preventing the chair from moving relative to the base.

On the other hand, when a car seat leaves the transport position in order to be directed to an installation position, the locking means can be deactivated so as to be able to release a portion of connection strap previously wound up, if necessary.

The presence of the reel may make it possible to assist the user in the rotation of the chair in order to change from an installation position to a transport position facing the road, for example.

According to a variant embodiment, the reel may be equipped with a "reel-locker" system, forming the locking means, by locking the reel in the event of shock, acceleration, braking or inclination greater than a predetermined threshold.

In one embodiment, the locking means are configured to lock the reel. In this case, the locking means may comprise at least one, in particular two toothed wheels disposed on either side of the spindle of the reel, on this spindle and cooperating, at least for one of them, with this spindle, and a catch forming a lock. A catch-release control, comprising for example a cable, may be provided. The catch cooperating with the toothed wheels prevents the reel from functioning, and therefore prevents the unwinding of the strap wound up in the reel unless the catch-release control is activated, then allowing the unwinding of the strap from the reel.

In another embodiment, the locking means are configured to lock the strap wound up in the reel and thus prevent it from it from unwinding. In this case, the locking means may comprise an auto-clamper preventing the unwinding of the wound up strap. A push button may be provided to pivot the auto-clamper and thus allow the unwinding of the strap. In this case, the push button may be actuated for example by rotary plate. In a variant, the auto-clamper may be controlled by cable and lever making it possible, by actuation thereof, to pivot the auto-clamper in order to release the wound up strap.

Advantageously, the car seat comprises two transport positions, namely a face-to-the-road position and a back-to-the-road position. This is because, by virtue of the invention, it is possible, unlike the prior art described above, to form a connection between the top part of the seat backrest and the base that allows effective holding of the seat in the event of shock, in the facing-the-road or back-to-the-road transport position and where applicable over any amplitude of inclination of the seat support, despite the distance between the vertical extension of the base and the backrest.

The total length of the connection strap is advantageously variable, being maximum in the back-to-the-road transport position, minimum in the facing-the-road transport position and intermediate in the installation position or positions.

The second end of the connection strap can be fixed to the backrest by means of an element able to move in rotation relative to the backrest on an axis substantially perpendicular to the backrest. In a particular embodiment, the element able to move in rotation comprises a hemisphere secured to the backrest. The presence of the element able to move in rotation may be useful for allowing correct positioning of the connection strap according to the position of the chair. During the rotation of the chair, the second end of the strap may rotate the element able to move in rotation. For example, the second end of the connection strap may be substantially horizontal when the chair is in the facing-the-road transport position, and pivot so as to be in a substantially vertical position when the seat is in the installation position or the back-to-the-road transport position, for example.

In another embodiment, the second end of the connection strap is fixed to the backrest in a vertical slot.

The vertical extension of the base comprises for example at least one post. An advantage of a post compared with a solid vertical extension may be to lighten the car seat while ensuring sufficient rigidity of the vertical extension. The post may form an arch constituting the vertical extension, the top of the arch having at least one opening for passage of the connection strap.

The car seat may also comprise at least one guide for passage of the connection strap. The guide may be configured so that, when the chair is rotated, the connection strap automatically comes to be placed in the guide.

The invention claimed is:

1. Car seat for a child, intended to equip a vehicle seat, comprising:
    a chair comprising a seat support and a backrest,
    a base with respect to which the chair is able to move in rotation between at least one transport position and at least one position of installation of a child,
    the car seat being secured to the vehicle by an anti-tilt strap connecting said base to an anchoring point of the vehicle and by fixing clamps or by a safety belt, and
    connection means of variable length for connecting the base to the top part of the backrest, the connection means comprising an end secured fixedly to the base and
    another end secured fixedly to the top part of the backrest.

2. Car seat according to claim 1, further comprising control means for controlling said connection means allowing or preventing a variation in the length thereof.

3. Car seat according to claim 1, wherein the connection means comprises a connection strap.

4. Car seat according to claim 3, wherein the connection strap is guided along a vertical extension of the base and connects the top part of the backrest to a bottom part of the base.

5. Car seat according to claim 3, wherein the connection strap passes through at least one opening formed in a top part of a vertical extension of the base.

6. Car seat according to claim 5, wherein said opening defines an arc making it possible to modify the orientation of the plane defined by the surface of the connection strap at this opening.

7. Car seat according to claim 3, wherein said connection strap comprises a first end secured to a reel and a second end,
wherein the first end is the end secured fixedly to the base or the end secured fixedly to the top part of the backrest and the second end is the end secured fixedly to the top part of the backrest or the end secured fixedly to the base.

8. Car seat according to claim 7, wherein further comprising locking means for locking the reel, arranged to prevent an unwinding of the connection strap from the reel.

9. Car seat according to claim 8, wherein the locking means is configured so as to lock the reel.

10. Car seat according to claim 8, wherein the locking means is configured so as to lock the strap close to the reel.

11. Car seat according to claim 1, further comprising two transport positions, namely a forward-facing position and a rearward-facing position.

12. Car seat according to claim 1, wherein the top part of a vertical extension carries or can cooperate with an end of the anti-tilt strap the other end of which is intended to be fixed to said anchoring point of the vehicle.

13. Car seat for a child, intended to equip a vehicle seat, comprising:
a chair comprising a seat support and a backrest,
a base with respect to which the chair is able to move in rotation between at least one transport position and at least one position of installation of a child,
the car seat being secured to the vehicle by an anti-tilt strap connecting said base to an anchoring point of the vehicle and by fixing clamps or by a safety belt, and
connection means of variable length for connecting the base to the top part of the backrest, the connection means comprising an end secured to the base and
another end secured to the top part of the backrest,
wherein the connection means comprise a connection strap,
wherein the connection strap passes through at least one opening formed in a top part of a vertical extension of the base,
wherein the connection strap passes through two openings formed in a top part of the vertical extension of the base, the openings comprising elongate slots forming a non-zero angle (β) between the elongate slots.

14. Car seat for a child, intended to equip a vehicle seat, comprising:
a chair comprising a seat support and a backrest,
a base with respect to which the chair is able to move in rotation between at least one transport position and at least one position of installation of a child,
the car seat being secured to the vehicle by an anti-tilt strap connecting said base to an anchoring point of the vehicle and by fixing clamps or by a safety belt, and
connection means of variable length for connecting the base to the top part of the backrest, the connection means comprising an end secured to the base and
another end secured to the top part of the backrest,
wherein the connection means comprise a connection strap,
wherein said connection strap comprises a first end secured to a reel and a second end,
wherein the first end is the end secured fixedly to the base or the end secured fixedly to the top part of the backrest and the second end is the end secured fixedly to the top part of the backrest or the end secured fixedly to the base,
locking means for locking the reel, arranged to prevent an unwinding of the connection strap from the reel,
wherein the locking means for locking the reel is configured so as to be automatically triggered when the car seat is in the transport position.

15. Car seat for a child, intended to equip a vehicle seat, comprising:
a chair comprising a seat support and a backrest,
a base with respect to which the chair is able to move in rotation between at least one transport position and at least one position of installation of a child,
the car seat being secured to the vehicle by an anti-tilt strap connecting said base to an anchoring point of the vehicle and by fixing clamps or by a safety belt, and
connection means of variable length for connecting the base to the top part of the backrest, the connection means comprising an end secured to the base and
another end secured to the top part of the backrest,
wherein the connection means comprise a connection strap,
wherein said connection strap comprises a first end secured to a reel and a second end,
wherein the first end is the end secured fixedly to the base or the end secured fixedly to the top part of the backrest and the second end is the end secured fixedly to the top part of the backrest or the end secured fixedly to the base,
wherein the second end of the connection strap is fixed to the top part of the backrest by means of an element able to move in rotation relative to the backrest on an axis substantially perpendicular to the backrest.

* * * * *